(12) United States Patent
Winnard

(10) Patent No.: US 9,764,460 B2
(45) Date of Patent: Sep. 19, 2017

(54) COVERED SELF-LOCKING AIR TOOL HOLDER

(71) Applicant: Stanley D Winnard, Dallas, TX (US)

(72) Inventor: Stanley D Winnard, Dallas, TX (US)

( * ) Notice: Subject to any disclaimer, the term of this patent is extended or adjusted under 35 U.S.C. 154(b) by 0 days.

(21) Appl. No.: 14/983,615

(22) Filed: Dec. 30, 2015

(65) Prior Publication Data
US 2017/0190045 A1 Jul. 6, 2017

(51) Int. Cl.
A47F 7/00 (2006.01)
F16M 13/02 (2006.01)
B25H 3/04 (2006.01)
A47L 13/512 (2006.01)

(52) U.S. Cl.
CPC .............. B25H 3/04 (2013.01); A47F 7/0028 (2013.01); A47L 13/512 (2013.01); F16M 13/02 (2013.01); F16M 2200/028 (2013.01)

(58) Field of Classification Search
CPC . B25H 3/04; B25H 3/003; B25H 3/06; B25H 3/006; A47F 7/0028; A47F 5/0846; A47F 5/0853; A47F 5/0838; F16M 13/022; F16M 2200/025; F16M 13/02
See application file for complete search history.

(56) References Cited

U.S. PATENT DOCUMENTS

| 1,485,092 | A | * | 2/1924 | Rauchut | A47L 13/512 211/65 |
| 2,371,433 | A | * | 3/1945 | Davis | B25H 3/04 211/162 |
| 3,156,388 | A | * | 11/1964 | Simmons | B25H 3/00 211/70.6 |
| 3,265,032 | A | * | 8/1966 | Hume | B63B 21/08 114/218 |
| 4,905,951 | A | * | 3/1990 | Putness | A47L 13/512 211/66 |
| 5,303,831 | A | * | 4/1994 | Miller | A47L 13/512 211/66 |
| 5,622,341 | A | * | 4/1997 | Stana | F16L 3/13 248/221.11 |
| 6,435,357 | B1 | * | 8/2002 | Lee | A47F 5/0838 211/70.6 |
| 6,637,082 | B1 | * | 10/2003 | Chang | F16B 2/10 24/489 |
| 7,445,129 | B2 | * | 11/2008 | Lin | B25H 3/04 211/60.1 |

(Continued)

Primary Examiner — Leslie A Nicholson, III
Assistant Examiner — Kimberley S Wright
(74) Attorney, Agent, or Firm — Peter V. Schroeder; Booth Albanesi Schroeder PLLC

(57) ABSTRACT

Disclosed is a tool holder for releasingly holding an air tool. The holder comprises a housing comprising at least one horizontal tool track, each of which for slidably receiving the stepped annular spout of the tool therewithin through a track point, the housing adapted to be secured to a vertical surface about the rear thereof, which is perpendicular to the track, and at least one hinge member hingedly secured within the housing such that, the at least one hinge member is angularly movable between an open and a closed position, the at least one hinged member biased towards the closed position. Each of the at least one hinge member comprises at least one blocker, each of which for blocking and unblocking the track point in the closed and open positions respectively.

16 Claims, 16 Drawing Sheets

(56) References Cited

U.S. PATENT DOCUMENTS

| | | | | |
|---|---|---|---|---|
| 8,069,995 B2* | 12/2011 | Winnard | ................ | B25H 3/003 |
| | | | | 211/70.6 |
| 8,424,817 B1* | 4/2013 | Chen | ........................ | B25H 3/00 |
| | | | | 211/70.6 |
| 9,095,975 B2* | 8/2015 | Green | ................... | A47L 13/512 |
| 2002/0084397 A1* | 7/2002 | Ross, Jr. | ................ | A63D 15/10 |
| | | | | 248/317 |
| 2005/0269275 A1* | 12/2005 | Lin | ......................... | B25H 3/04 |
| | | | | 211/70.6 |
| 2006/0151405 A1* | 7/2006 | Lin | ......................... | B25H 3/04 |
| | | | | 211/60.1 |
| 2006/0208138 A1* | 9/2006 | Huang | ............... | A46B 15/0095 |
| | | | | 248/110 |
| 2006/0243686 A1* | 11/2006 | Grayson | ............. | A47B 81/005 |
| | | | | 211/70.6 |
| 2009/0218303 A1* | 9/2009 | Winnard | ................ | B25H 3/003 |
| | | | | 211/70.6 |
| 2011/0114580 A1* | 5/2011 | Chen | ........................ | B25H 3/04 |
| | | | | 211/70.6 |
| 2012/0049020 A1* | 3/2012 | Stock | ........................ | F16B 2/10 |
| | | | | 248/206.5 |
| 2013/0043201 A1* | 2/2013 | Wang | .................... | B25H 3/003 |
| | | | | 211/70.6 |
| 2015/0001367 A1* | 1/2015 | Green | ................... | A47L 13/512 |
| | | | | 248/539 |
| 2015/0226244 A1* | 8/2015 | Likosar | ................. | A63C 11/02 |
| | | | | 24/495 |

* cited by examiner

COVERED SELF-LOCKING AIR TOOL HOLDER

BACKGROUND

Field of the Invention

The present invention relates to apparatuses for holding work tools and more particularly to a self-locking tool holder adapted to releasingly hold an air tool about the spout thereof.

In a labor-intensive work environment, such as, a construction site, the tools and implements provided by a contractor company can be accessed by the workers from an assigned location wherein, upon usage of those tools, they are supposed to be returned to the aforementioned location. For storage purposes, generally, these tools are either hung on a hook or placed on a table top or in a container. For a tool like an air tool to be hung on a hook, the tool needs to be attached with a lanyard or the like. Now, firstly, finding a lanyard for every tool is not a convenient proposition. Secondly, not every lanyard is strong enough to hold its heavy tool for an extended period of time. And finally, tools hooked about their lanyards, may dangle, which may lead to collision with surfaces like walls, etc., or with other tools hung close by, which ultimately may lead to breakage, etc. Therefore, dangling heavy tools is not an ideal storage solution.

Alternatively, placing the tools on a flat surface, such as, on a table top, etc., is not an ideal solution either. This is because firstly, storage on a horizontal surface expends large space, which is not efficient when it comes to managing labor-intensive work place. Secondly, placing the tools on a flat surface may lead to a pile up, which may result in the tools falling off ultimately leading to their breakage, etc., again. So is the case with placing them in a closed container.

Therefore, in the light of what is discussed, there is a need in the art for a storage solution for heavy air tools.

SUMMARY

The present invention comprises a covered, self-locking air tool holder for holding a heavy air tool about the spout thereof. As the tool is suspended from its spout and as the spout is rigid, there is no question of the tool being dangled leading to any collision.

The holder comprises a rectangular housing with the front and top thereof being open, and a hinge member hingedly coupled within the housing between the two vertical sides thereof. The housing comprises an elongate horizontal tool track disposed on its bottom wherein, the tool track proceeds from a track point, which comprises a circular opening dimensionally configured for allowing the spout to pass therethrough so as to be eventually slidably received through the tool track. The hinge member comprises a blocker, which comprises circular piece, the dimensions of which correspond to that of the track point.

The hinge member is hingedly coupled to the housing such that, the hinge member is movable between an open position and a biased closed position wherein, in the closed position the blocker is received within the track point so as to block the ingress into and the egress from the tool track. As the hinge member is manually moved to the open position, the blocker unblocks the track point allowing the ingress into and the egress from the tool track.

Therefore, in order to secure the tool to the holder, the tool about the spout thereof is pushed upwardly against the blocker causing hinge member to move to the open position rendering the track point accessible. As the spout is slid into the tool track through the track point, the hinge member, on account of being biased towards the closed position, blocks the track point once the spout is no longer in contact with the blocker. In order to disengage the tool from the holder, the hinge member is simply moved to the open position by manually lifting the same so as to allow the tool to come out through the track point.

Other objects and advantages of the embodiments herein will become readily apparent from the following detailed description taken in conjunction with the accompanying drawings.

FIGURES—REFERENCE NUMERALS

Figure 1:
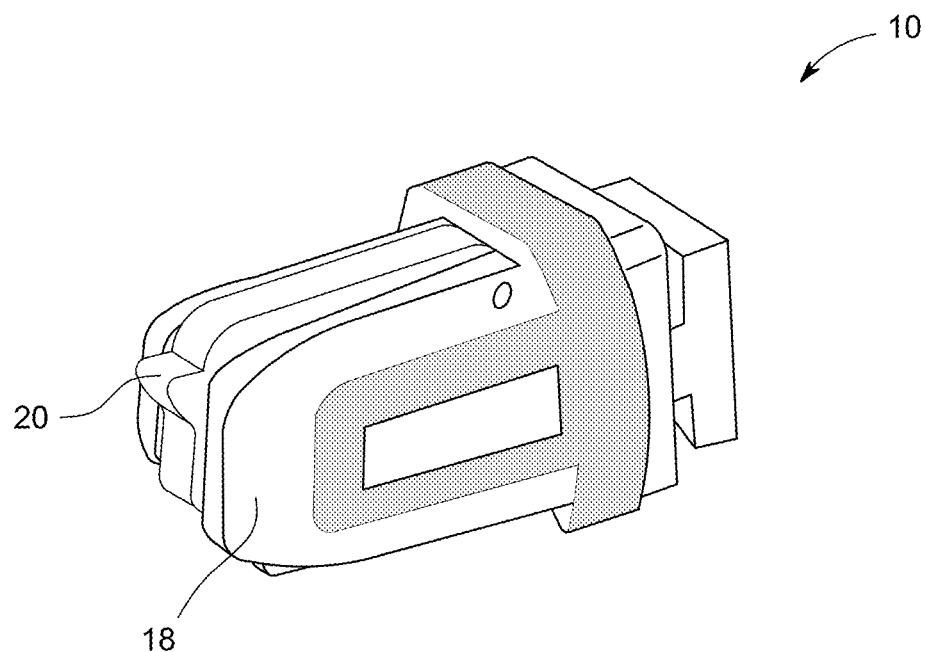
FIG. 1, according to an embodiment of the present invention, is an illustration of a perspective view of the tool holder.
Figure 2:
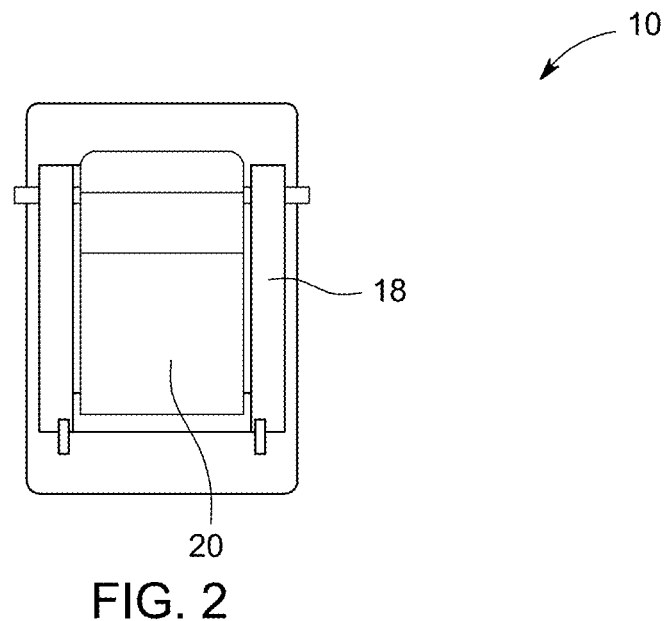
FIG. 2, according to an embodiment of the present invention, is an illustration of a front view of the tool holder.
Figure 3:
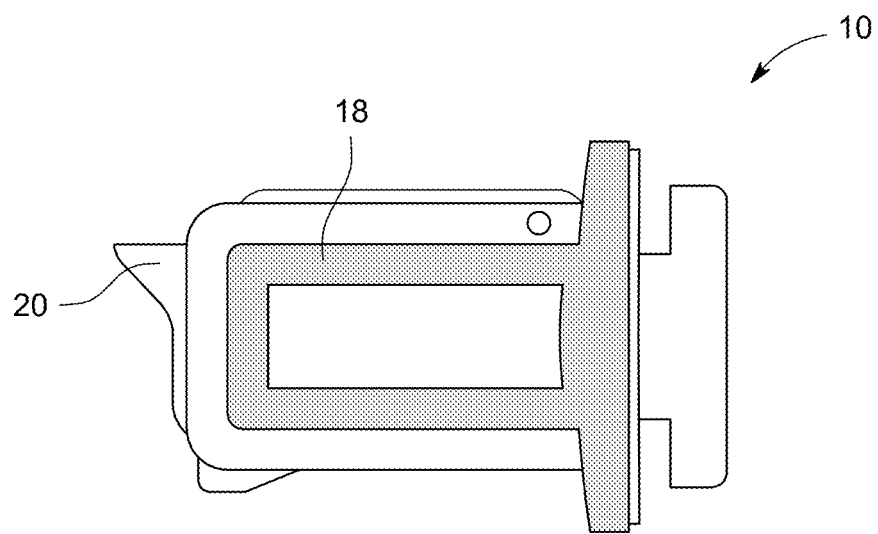
FIG. 3, according to an embodiment of the present invention, is an illustration of a side view of the tool holder.
Figure 4:
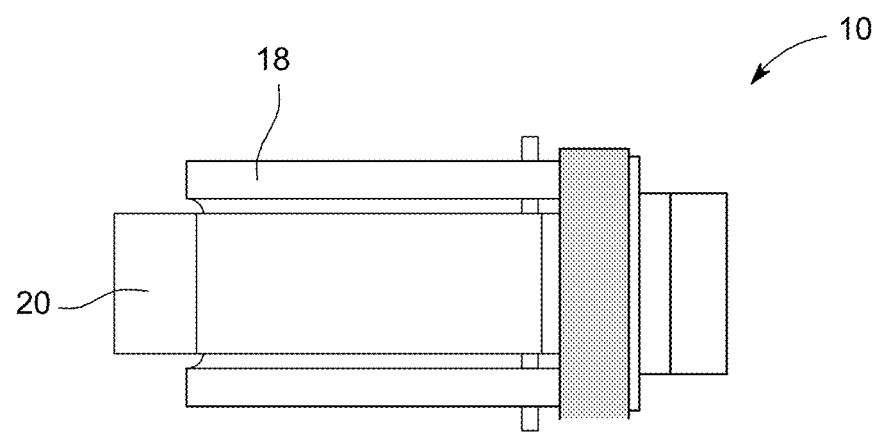
FIG. 4, according to an embodiment of the present invention, is an illustration of a top view of the tool holder.
Figure 5:
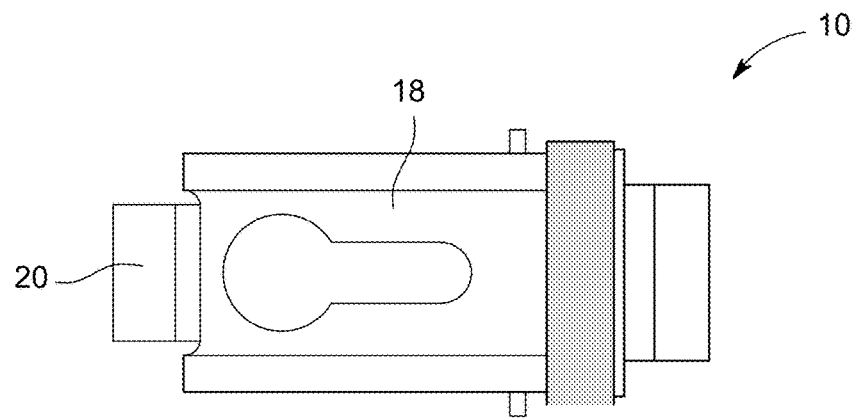
FIG. 5, according to an embodiment of the present invention, is an illustration of a bottom view of the tool holder.
Figure 6:
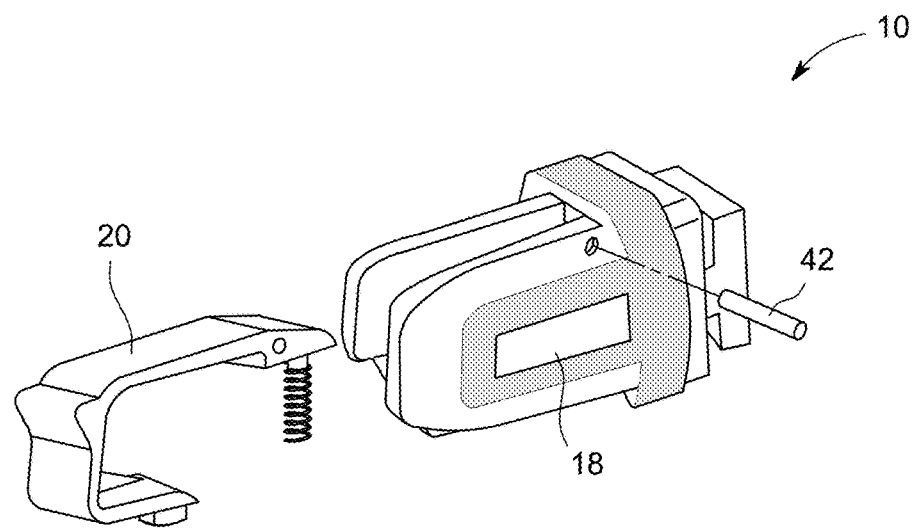
FIG. 6, according to an embodiment of the present invention, is an illustration of an exploded perspective view of the tool holder.
Figure 7:
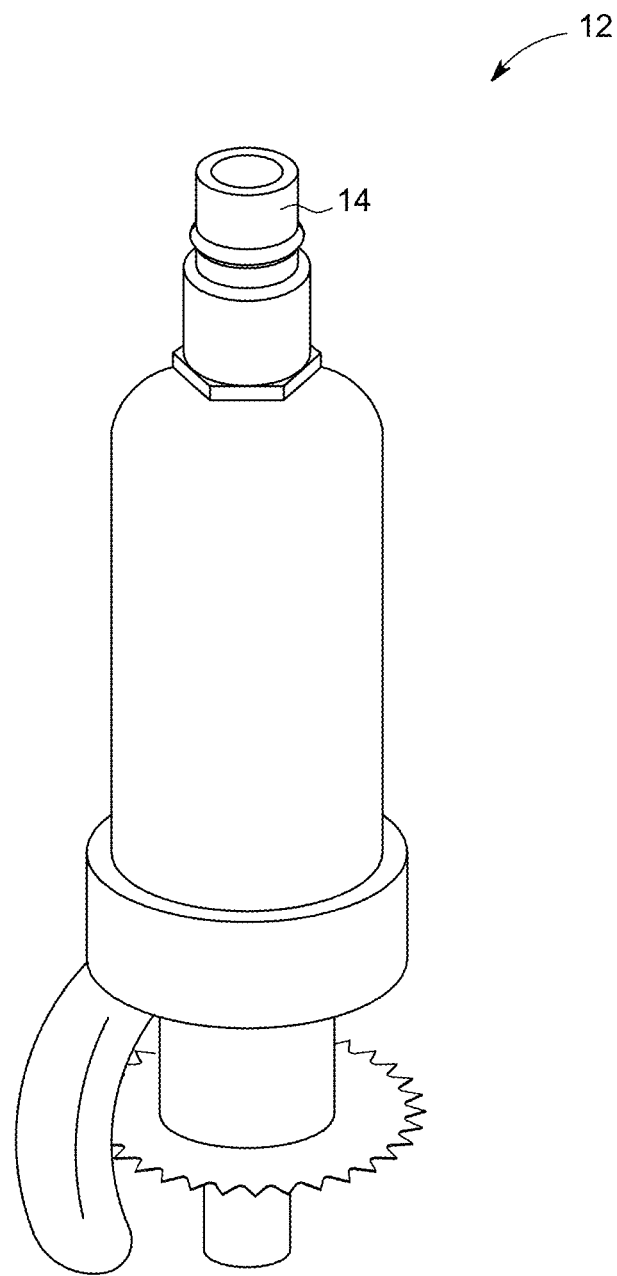
FIG. 7, according to an embodiment of the present invention, is an illustration of the tool.
Figure 8:
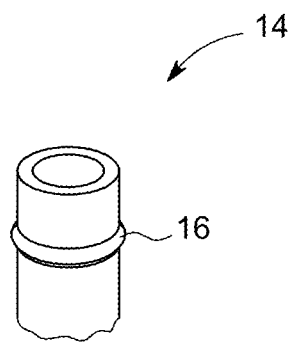
FIG. 8, according to an embodiment of the present invention, is an illustration of the spout.
Figure 9:
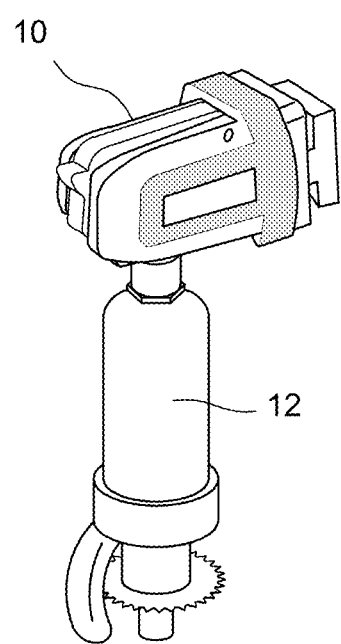
FIG. 9, according to an alternate embodiment of the present invention, is an illustration of the tool secured to the holder.
Figure 10:
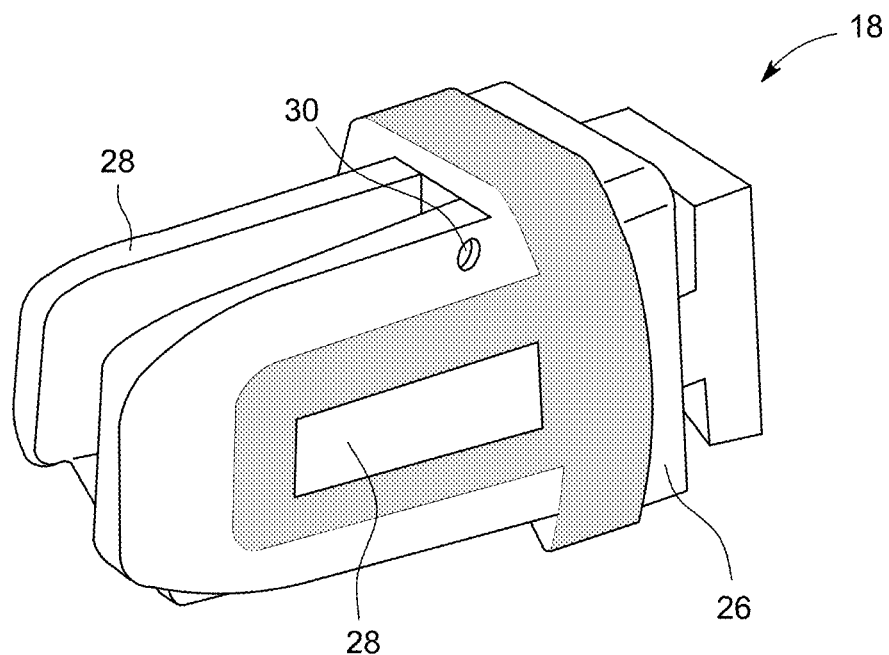
FIG. 10, according to an embodiment of the present invention, is an illustration of a perspective view of the housing.
Figure 11:
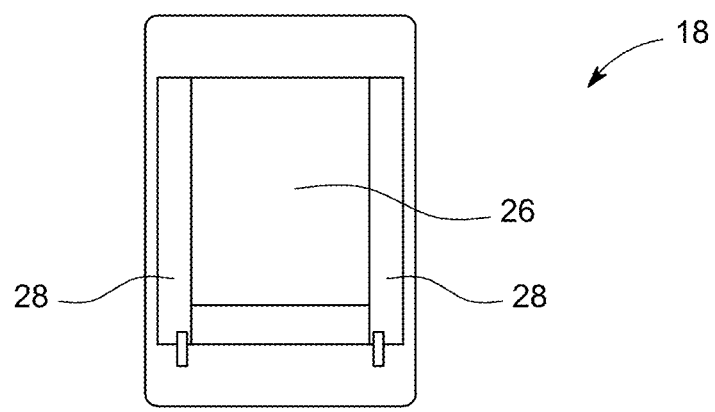
FIG. 11, according to an embodiment of the present invention, is an illustration of a front view of the housing.
Figure 12:
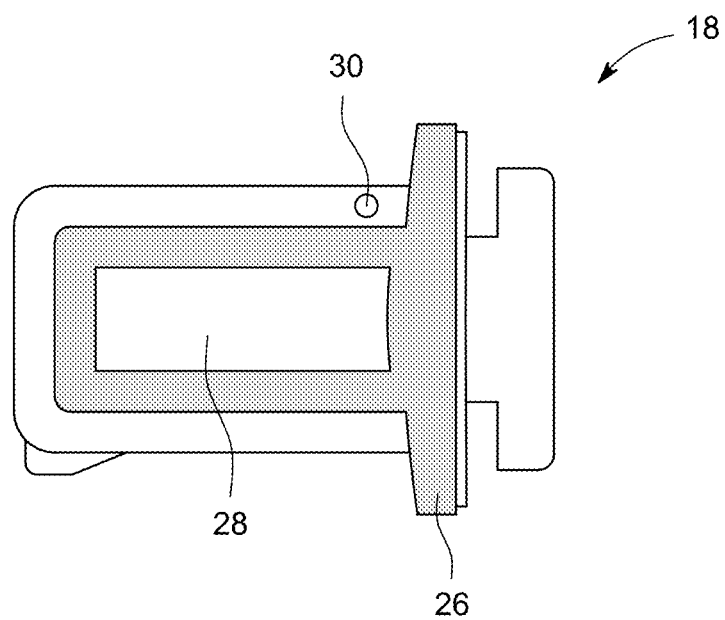
FIG. 12, according to an embodiment of the present invention, is an illustration of a side view of the housing.
Figure 13:
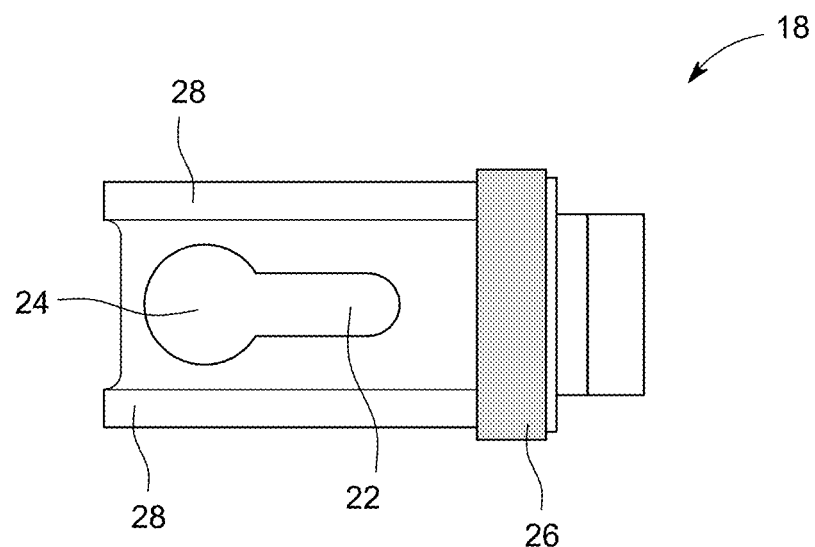
FIG. 13, according to an embodiment of the present invention, is an illustration of a top view of the housing.
Figure 14:
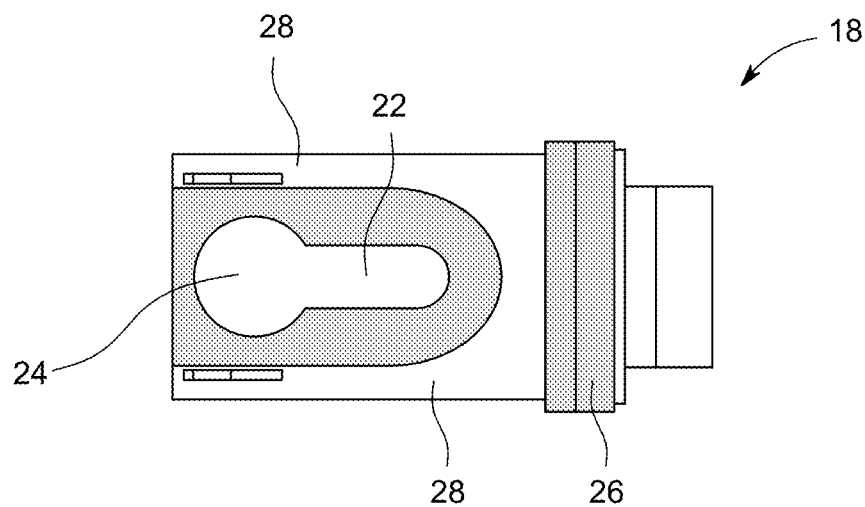
FIG. 14, according to an embodiment of the present invention, is an illustration of a bottom view of the housing.
Figure 15:
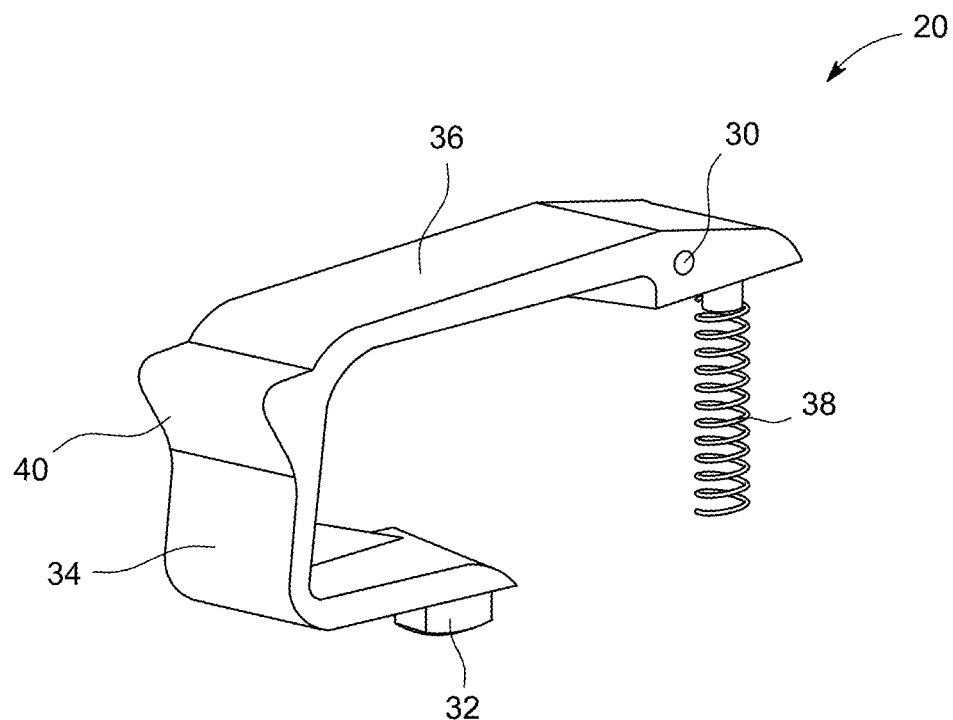
FIG. 15, according to an embodiment of the present invention, is an illustration of a perspective view of the hinge member.
Figure 16:
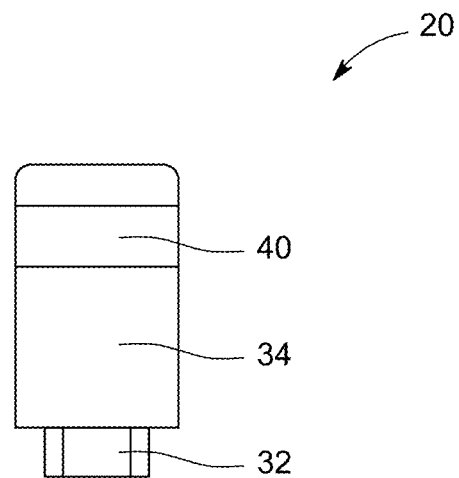
FIG. 16, according to an embodiment of the present invention, is an illustration of a front view of the hinge member.
Figure 17:
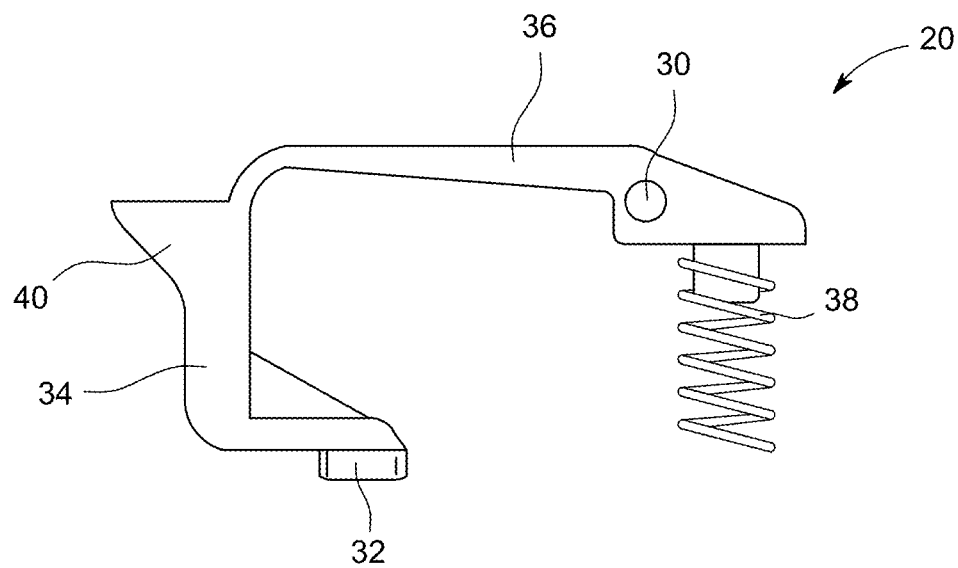
FIG. 17, according to an embodiment of the present invention, is an illustration of a side view of the hinge member.
Figure 18:
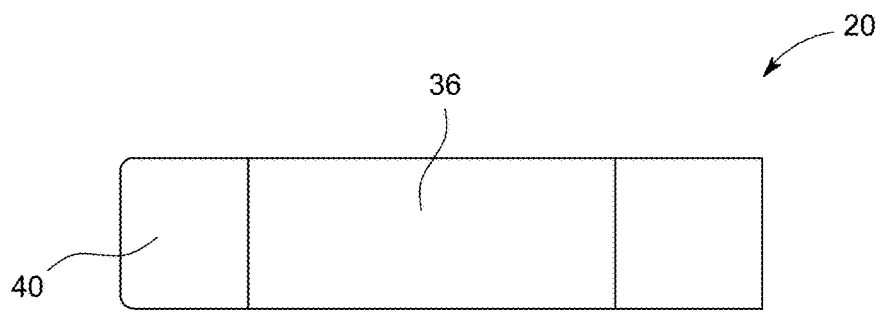
FIG. 18, according to an embodiment of the present invention, is an illustration of a top view of the hinge member.
Figure 19:
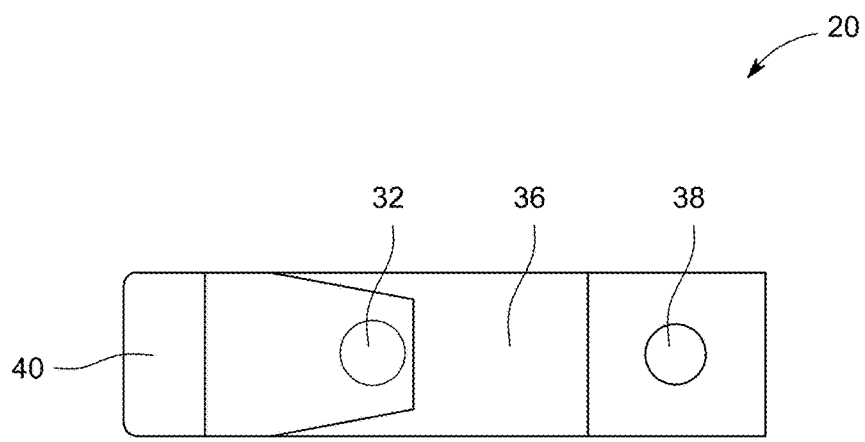
FIG. 19, according to an embodiment of the present invention, is an illustration of a bottom view of the hinge member.

10—Self-locking Air Tool Holder
12—Workman's Tool
14—Spout
16—Annular Ledge
18—Housing
20—Hinge Member
22—Tool Track
24—Track Point
26—Rear of the Housing
28—Side of the Housing
30—Pin Hole
32—Blocker
34—Front Panel
36—Top Panel
38—Compression Spring
40—Projection
42—Hinge Pin
44—Rail
48—Guide
50—Holder Track

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Referring to FIGS. 1 through 9, the present invention comprises a covered self-locking air tool holder 10 for holding a workman's tool 12 having a cylindrical spout 14 with an annular ledge 16 around the circumference of the spout 14. More particularly, as will be apparent from the following body of text, the tool 12 is adapted to be held by the holder 10 about the annular ledge 16. The tool 12 exemplarily comprises a pneumatic drilling machine. The holder 10 comprises two basic components viz., a housing 18 and a hinge member 20 wherein, the hinge member 20 is adapted to be hingedly coupled to the housing 18.

Referring to FIGS. 1 through 6, and 10 through 14, a holder body 17 has a housing 18, which is preferably made of a suitable rigid plastic, comprises a substantially rectangular housing with the top and front thereof being open. The bottom of housing 18 comprises a horizontal arm 19 defining an elongate horizontal tool track 22 proceeding from a track point 24 and terminating closer to the rear 26 of the housing 18. The track point 24 located on the bottom of housing 18 comprises a circular opening integral with the tool track 22. In a way, by taking the tool track 22 and the track point 24 into consideration, the bottom of the housing 18 is almost open. The top corners of the two opposing sides 28 of the housing 18 closer to the rear 26 comprise a pair of opposingly-disposed pin holes 30, the utility of which will become apparent from the following body of text.

Referring to FIGS. 1 through 6 and 15 through 19, the hinge member 20 comprises a blocker 32, a front panel 34, a top panel 36, and a compression spring 38 wherein, the blocker 32, front and top panels 34 and 36 are integral with respect to one another. The blocker 32 comprises a flat circular piece, the dimensions of which correspond to that of the track point 24. Each of the front and top panels 34 and 36 comprises mutually perpendicular, elongate, substantially rectangular panels or strips. While the front panel 34 proceeds perpendicularly from the blocker 32, the top panel 36 proceeds perpendicularly from the free end of the front panel 34 whereby, the blocker 32 and the top panel 36 are parallel to one another. The width of each of the front and top panels 34 and 36 is substantially equivalent to the distance between the two vertical sides of the housing 18. The outer corner edge between the front and the top panel 34 and 36 comprises a projection 40 extending outwardly wherein, the utility of the projection 40 will become apparent from the following body of text. The free end of the top panel 36 is hingedly secured within the housing 18. More particularly, a hinge pin 42 extends through the top panel 36 laterally via a pin hole 30 and engages the other pin hole 30 so as to hinge the hinge member 20 to the housing 18. The spring 38 is attached to the bottom surface of the top panel 36 at the free end thereof wherein, the utility of the spring 38 will become apparent from the following body of text. Notably, the free end of the spring 38 abuts the top surface of the bottom of the housing 18.

Figure 20:
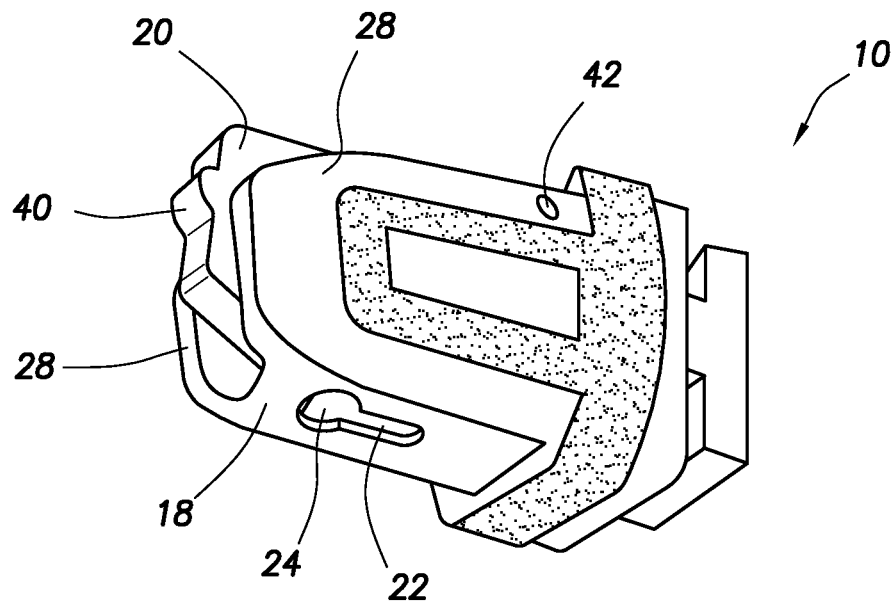
FIG. 20, according to an embodiment of the present invention, is an illustration of the bottom perspective view of the holder being in the open position.
Figure 21:
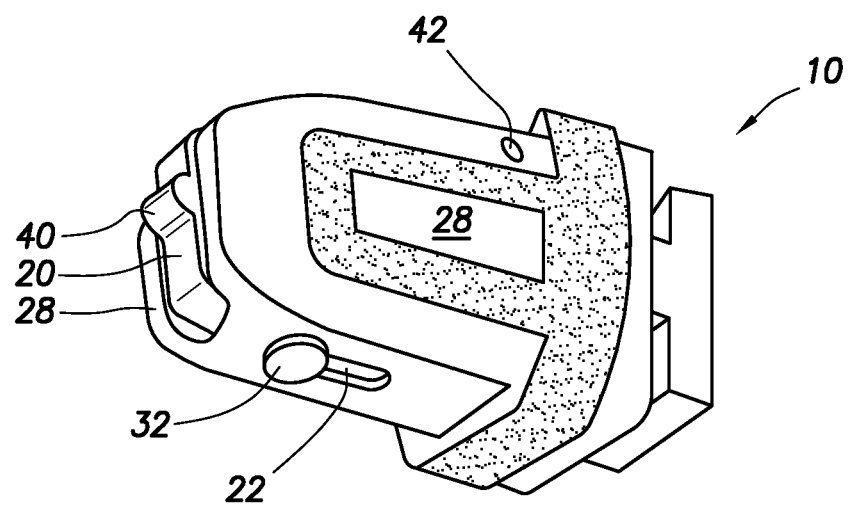
FIG. 21, according to an embodiment of the present invention, is an illustration of the bottom perspective view of the holder being in the closed position.

Referring to FIGS. 20 and 21, the hinge member 20, about the hinge pin 42 is movable between an upward open position and a downward closed position wherein, on account of the spring 38, the hinge member is 20 biased towards the closed position, where top and front panels 34 and 36 are flush with the vertical sides 28 of the housing 18 rendering the housing 18 together with the hinge member 20 a closed, rectangular hollow structure. Notably, in the closed position, the blocker 32 sealingly fits into the track point 24 thereby, blocking the ingress into and the egress from the tool track 22. On the other hand, as the hinge member 20 is manually moved to the open position by manually lifting the same about the projection member 40, the blocker 32 no longer blocks the track point 24 permitting ingress into and egress from the tool track 22.

Figure 22:
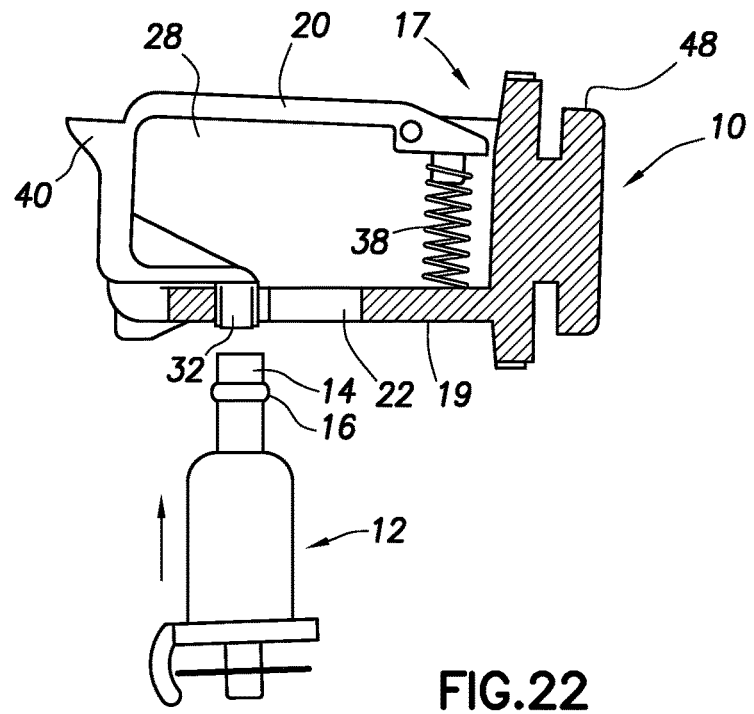
FIGS. 22 through 24, according to an embodiment of the present invention, are sequential illustrations of the tool being received into the holder.
Figure 23:
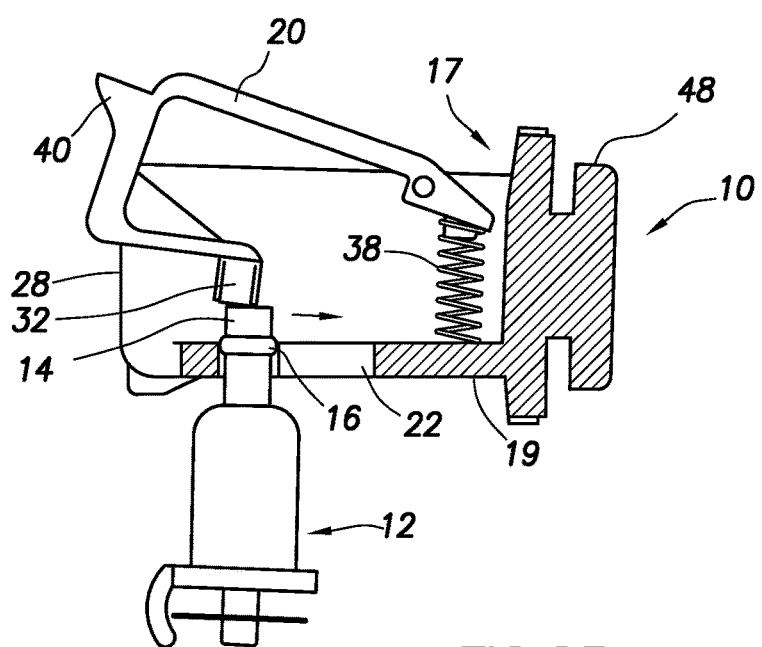
Figure 24:
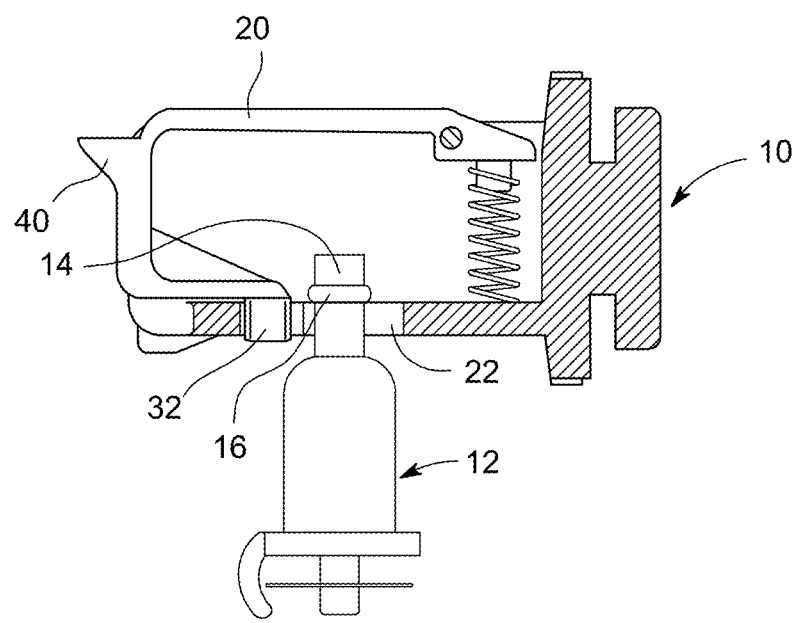

Referring to FIGS. 22 through 24, in order to secure the tool 12 to the holder 10, which, by default, is in the closed position, the tool 12 about the spout 14 thereof is pushed upwardly against the blocker 32 causing hinge member 20 to move to the open position rendering the track point 24 accessible. As the spout 14 is slid into the tool track 22 through the track point 24 about the annular ledge 16 (which acts as a guide), the hinge member 20, on account of being biased towards the closed position, blocks the track point 24 once the spout 14 is no longer in contact with the blocker 32. In order to disengage the tool 12 from the holder 10, the hinge member 20 is simply moved to the open position by manually lifting the same about the projection 40 so as to allow the tool 12 to come out through the track point 24. In one embodiment (not shown), the tool track 22 is dimensionally adapted to be lengthy enough to accommodate more than one tool 12 therewithin.

Figure 25:
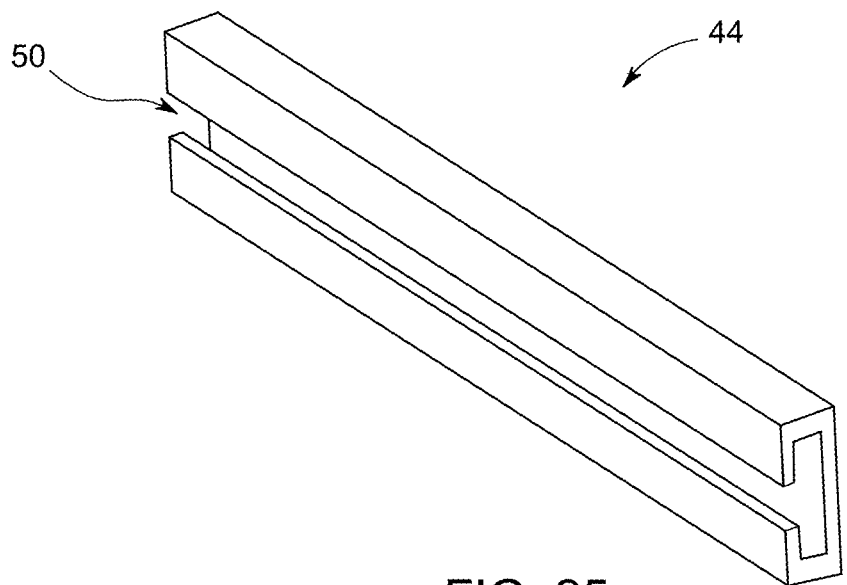
FIG. 25, according to an embodiment of the present invention, is an illustration of a perspective view of the rail.
Figure 26:
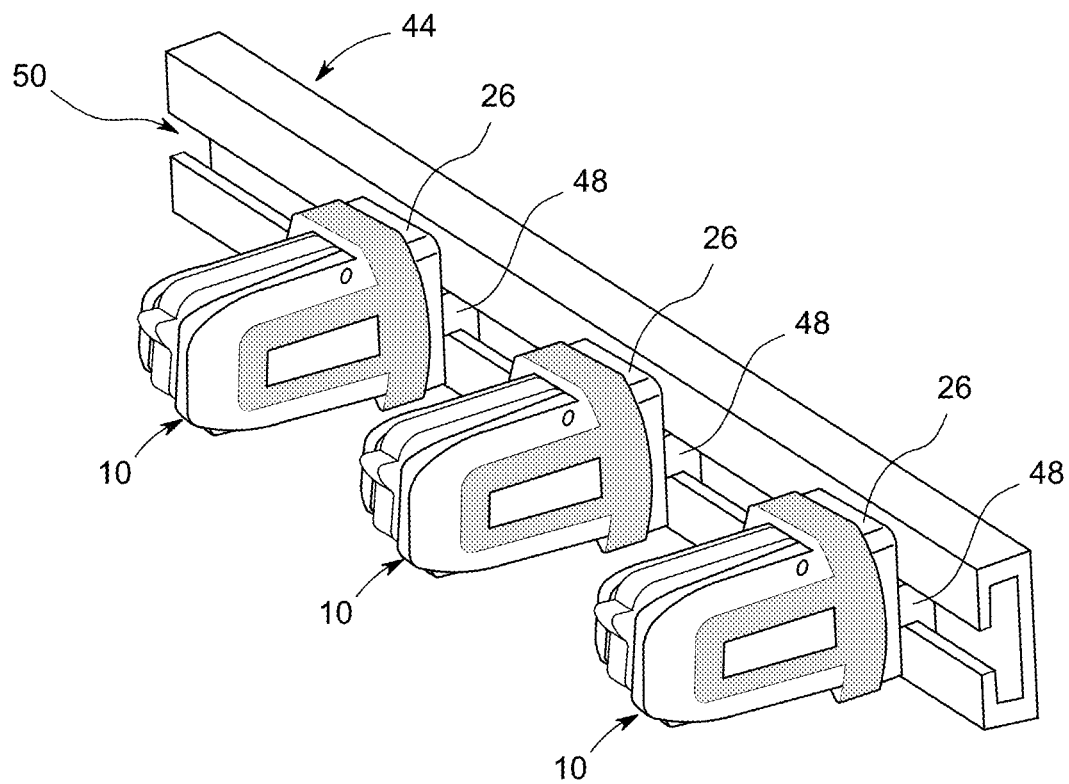
FIG. 26, according to an embodiment of the present invention, is an illustration of a plurality of holders assembled to the rail.

Referring to FIGS. 25 and 26, one or more holders 10 are adapted to be coupled to an elongate horizontal rail 44, which, in turn, is adapted to be secured to a vertical surface such as, the surface of a peg board. More particularly, as can be appreciated from the referred drawings, the rear 26 of the housing 18 comprises a guide 48, which is adapted to be slidably received within an elongate, horizontal holder track 50 of the rail 44 in order to secure a holder 10 thereto.

Referring to FIGS. 25 and 26, in one embodiment, the holder comprises a hook in lieu of the guide 48 wherein, the hook is adapted to be coupled to a horizontal top edge of a vertical panel. Notably, the edge could either be a rolled or a straight edge. In one embodiment, the hook is attached with a magnet so as to hold the holder in place once the holder is hooked onto the edge. In one embodiment (not shown), a clip such as a tape measure clip, a pocket knife clip, or a spring clip is attached to be rear of the holder 10 wherein, the tool holder 10 adapted to be secured to a surface about the clip. In another embodiment (not shown), a squeeze button function peg board backing, such as a magna peg, or the like is used to secure the holder 10 to a peg board. In yet another embodiment (not shown), the rear of the holder 10 comprises is secured with a magnet about which, the holder 10 is secured to a vertical surface that is magnetically attractable. Alternatively, the rail 44 may be adapted to be fitted on most tool boxes, tool carts, on the inside of the tool box drawer (such that, the drawer can be closed with the rail attached to the drawer). In yet another embodiment (not shown), the rail 44 comprises a lip wherein, the rail is adapted to be hanged on a metal peg hook bar, peg board or other such devices, about the lip.

Figure 27:
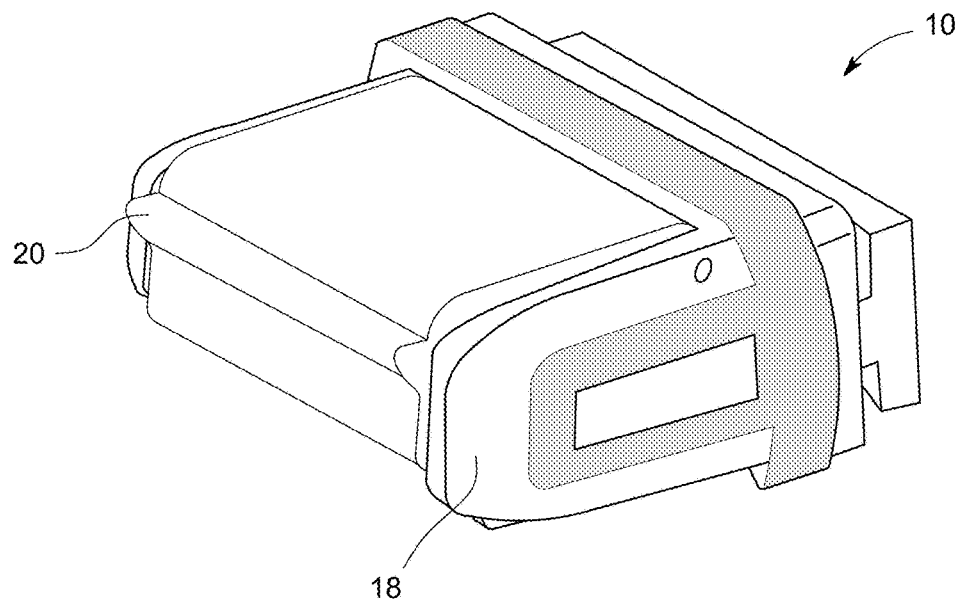
FIG. 27, according to an additional embodiment of the present invention, is an illustration of a top perspective view of the tool holder.
Figure 28:
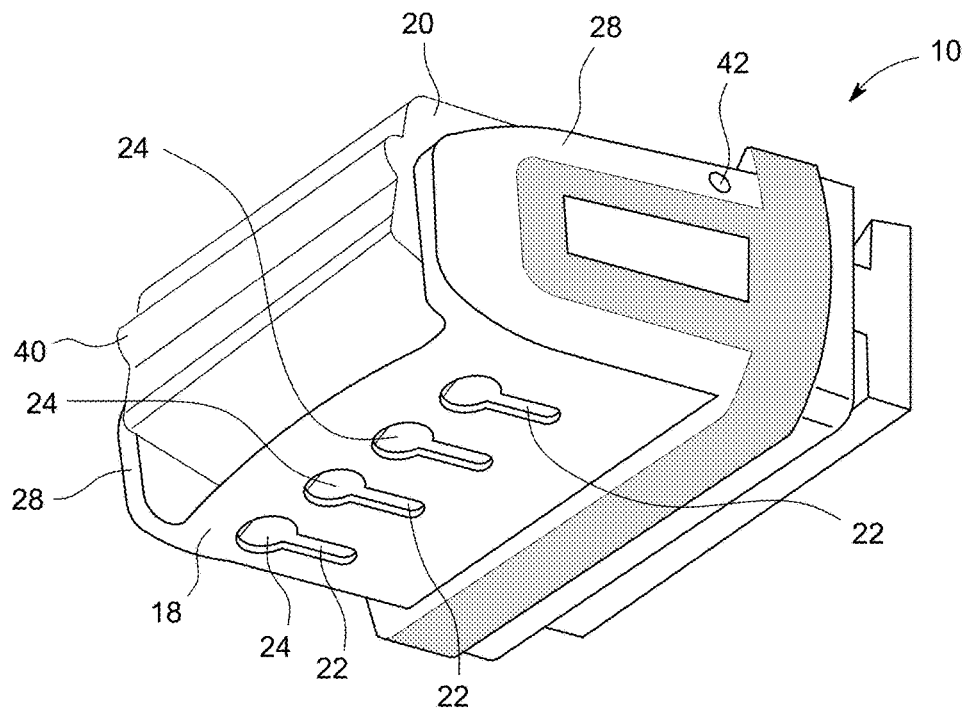
FIG. 28, according to the additional embodiment of the present invention, is an illustration of a bottom perspective view of the tool holder.
Figure 29:
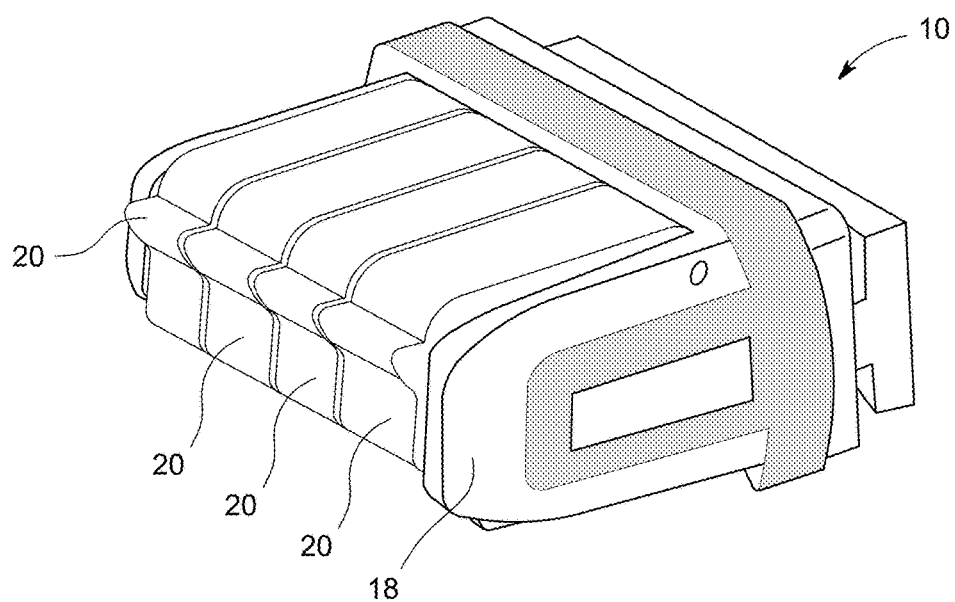
FIG. 29, according to another additional embodiment of the present invention, is an illustration of a top perspective view of the tool holder.

Referring to FIGS. 27 and 28, the holder 10, in lieu of one tool track 22, comprises a plurality of tool tracks 22 that parallel to and aligned with one another. The plurality of tool tracks 22 share a common hinge member 20 that comprises a plurality of blockers 32, the number of which correspond to that of the plurality of tool tracks 22. Referring to FIG. 29, in yet another embodiment, the holder 10, while comprising a plurality of tool tracks 22 also comprises a plurality of hinge members 20 wherein, each hinge member 20 corresponds to a tool track 22. Each of the plurality of hinge members 20 comprises a blocker 32 for blocking a corresponding track point 24.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A self-locking air tool holder for releasably holding an air tool having a spout with an annular ledge thereon, the holder comprising:
   (a) a housing comprising at least one horizontal tool track, each tool track adapted to support the tool and slidably receive the annular ledge of the spout of the tool thereon through a track point, the housing adapted about the rear thereof to be secured to a vertical surface which is perpendicular to the at least one tool track; and
   (b) at least one hinge member hingedly secured to the housing such that each hinge member is angularly movable between an open and a closed position, each hinge member biased towards the closed position; each hinge member comprising at least one blocker for blocking and unblocking the a track point in the closed and open positions respectively; the housing substantially rectangular in cross-section with the top and the front being open so as to allow for the at least one hinge member to hingedly move between the open and closed positions; a horizontal hinge pin connecting two parallel, vertical sides of the housing, each hinge member hinged about the pin between the two sides; and the at least one tool track disposed between the two sides, on a bottom of the housing.

2. The holder of claim 1 wherein, each of the at least one hinge member further comprises:
   (a) a vertical front panel extending upwardly from the blocker; and
   (b) a horizontal top panel extending between the front panel and the hinge pin; the top panel hinged to the pin; the front and top panels integral with one another.

3. The holder of claim 2 wherein, the collective widths of the front and top panels of the at least one hinge member substantially span the distance between the two vertical sides whereby, the holder is rendered a substantially rectangular cross-sectioned closed housing in the closed position.

4. The holder of claim 2 wherein, a projection extends from the top of the front panel; the projection about which the corresponding hinge member is adapted to be manually lifted to the open position.

5. The holder of claim 2 wherein, each of the at least one hinge member further comprises a compression spring secured to the bottom of the top panel between the pin and the rear whereby, as the at least one hinge member is moved to the open position, the resistance exerted by the compression spring on the bottom of the housing causes the at least one hinge member to bias towards the closed position.

6. The holder of claim 1 wherein, the track point comprises a circular opening through which, the spout is initially upwardly received; the track point integral with the tool track thereof.

7. The holder of claim 6 wherein, the blocker comprises a circular piece, which, in the closed position, substantially snugly fits into the track point blocking the same.

8. The holder of claim 1 comprising a guide adapted to be slidably received within an elongate horizontal holder track of an elongate, horizontal rail, about which, the holder is adapted to be secured to a vertical surface.

9. The holder of claim 1 wherein, the at least one hinge member comprises one hinge member.

10. The holder of claim 9 wherein, the at least one tool track comprises one tool track.

11. The holder of claim 9 wherein, the at least one tool track comprises a plurality of tool tracks.

12. The holder of claim 11 wherein, the tool tracks are parallel to and aligned with each other.

13. The holder of claim 1 wherein, the at least one hinge member comprises a plurality of hinge members.

14. The holder of claim 13 wherein, the at least one tool track comprises a plurality of tool tracks.

15. The holder of claim 14 wherein, the tool tracks are parallel to and aligned with each other.

16. A self-locking air tool holder for releasably holding an air tool, the holder comprising:
   (a) a substantially rectangular cross-sectioned housing comprising at least one horizontal tool track, each tool track for slidably receiving the stepped annular spout of the tool therewithin through a track point, the housing adapted about the rear thereof to be secured to a vertical surface, which is perpendicular to the tool track, the top and front of the housing being open, the at least one tool track being disposed on the bottom of the housing; and
   (b) a horizontal hinge pin connecting two parallel vertical sides of the housing; and
   (c) at least one hinge member hingedly secured to housing at the hinge pin such that, the at least one hinge member is angularly movable between an open and a closed position, the at least one hinged member biased towards the closed position; each of the at least one hinge member comprising:
      (i) at least one blocker, each of which for blocking and unblocking a track point in the closed and open positions respectively;
      (ii) a vertical front panel extending upwardly from the at least one blocker; and
      (iii) a horizontal top panel extending between the front panel and the shaft; the top panel hinged to the pin, the width of the front and top panels substantially spanning the distance between the two vertical sides whereby, the holder is rendered a substantially rectangular cross-sectioned closed housing in the closed position.

\* \* \* \* \*